United States Patent
Gocha et al.

(10) Patent No.: US 11,578,828 B2
(45) Date of Patent: Feb. 14, 2023

(54) CONNECTOR HAVING A GUIDED PILOT

(71) Applicant: Cooper Standard Automotive, Inc., Northville, MI (US)

(72) Inventors: Kenneth J. Gocha, Flint, MI (US); Stephen S. Frederiksen, Clarkston, MI (US); Christian A. Veraza, Auburn Hills, MI (US)

(73) Assignee: Cooper-Standard Automotive, Inc., Northville, MI (US)

( * ) Notice: Subject to any disclaimer, the term of this patent is extended or adjusted under 35 U.S.C. 154(b) by 169 days.

(21) Appl. No.: 17/110,618

(22) Filed: Dec. 3, 2020

(65) Prior Publication Data
US 2022/0178481 A1 Jun. 9, 2022

(51) Int. Cl.
*F16L 37/14* (2006.01)

(52) U.S. Cl.
CPC ......... *F16L 37/144* (2013.01); *F16L 2201/10* (2013.01)

(58) Field of Classification Search
CPC ... F16L 2201/10; F16L 37/144; F16L 37/088; F16L 37/0885; F16L 37/142; F16L 37/14
USPC .......................................... 285/305, 93, 319
See application file for complete search history.

(56) References Cited

U.S. PATENT DOCUMENTS

| | | | | |
|---|---|---|---|---|
| 2004/0036283 | A1* | 2/2004 | Furuya | F16L 37/0985 285/305 |
| 2019/0271426 | A1 | 9/2019 | Tomlinson | |
| 2019/0390808 | A1 | 12/2019 | Trotter et al. | |
| 2020/0056730 | A1* | 2/2020 | Kimura | F16L 37/1205 |
| 2020/0166167 | A1 | 5/2020 | Hagen et al. | |
| 2020/0191310 | A1 | 6/2020 | Kim et al. | |
| 2020/0309298 | A1* | 10/2020 | Kuhn | F16L 37/084 |
| 2020/0355308 | A1* | 11/2020 | Hunt | F16L 37/08 |
| 2020/0408343 | A1* | 12/2020 | Choi | F16L 37/144 |
| 2021/0054957 | A1* | 2/2021 | Gocha | F16L 37/0885 |

FOREIGN PATENT DOCUMENTS

| | | |
|---|---|---|
| DE | 202020103903 U1 | 7/2020 |
| DE | 102020108073 A1 * | 9/2021 |
| WO | WO-2021190897 A1 * | 9/2021 |

OTHER PUBLICATIONS

European Patent Office, "Extended European Search Report" for European Patent Application 21211874.9, pp. 1-6, Munich, Germany, dated Apr. 12, 2022.

* cited by examiner

*Primary Examiner* — Aaron M Dunwoody
(74) *Attorney, Agent, or Firm* — Paschall & Associates, LLC; James C. Paschall

(57) ABSTRACT

A connector and process for coupling a tube and the resulting assembly is disclosed. A receptacle includes a pilot in a mounting position. The pilot including an indicator piece and guide members each located in a respective channel on the receptacle and slidable within the channels from the mounting position to a final position. A retention clip having legs is urged into a spread condition during a transition between the mounting position and the final position wherein in the final position the legs of the retention clip retract to a relaxed condition, the indicator piece becomes visible on the receptacle and the first and second guide members latch the pilot to the receptacle.

20 Claims, 8 Drawing Sheets

CONNECTOR HAVING A GUIDED PILOT

TECHNICAL FIELD

The field relates to a connector for connecting a tube to a device. More particularly, this disclosure relates to a connector having a guided pilot for capturing the endform of a tube.

BACKGROUND

In fluid piping in which a tube, such as a pipe or a hose, is joined to another device such as a pump, tank or another tube, a connector may be used for joining the tube to the other device. The connector may have a tubular receptacle for receiving a tube. The tube may include an endform for snap engagement to enable quick connection with a retainer to provide locking relation between the tube and the connector. A wire retainer is often used that has a pair of engagement arms that extend through slots in the receptacle to clip endform in the connector.

The connector may include a seal ring between an inner periphery of a socket in the connector and an outer periphery of the endform to provide a fluid-tight seal that prevents leaking. Insufficient insertion of the endform into the connector can permit the seal to lack engagement with the endform and the connector to leak.

Fluid piping connectors may find use in the auto industry. The connector is often equipped with an indexing member to align with an indexing member on the endform to ensure that endform is inserted with the proper orientation. Several orientations between the endform and the connector are often applicable, multiplying the number of connectors that must be made available to serve all orientations.

A wire retainer can be made of a material that is harder than the tube or an endform on the tube. As the endform of the tube is inserted into the connector, the inwardly biased retainer can scrape the endform of the tube to an extent that it prevents or inhibits a fluid tight seal facilitated by the seal ring. The wire retainer which is mounted to the connector housing has to be retained in a mounted position for snap-engaging with the annular engaging projection of the pipe.

Thus, the wire retainer is configured such that each engaging arm is bent over or inclined radially inward, for example, at a leading end thereof to define an engaging portion, and the engaging portion engages with an outer peripheral surface of the connector housing in a pull-out direction when the wire retainer is mounted to the connector housing.

Connectors of the type described above are known in practice in different embodiments. The known connectors often have the disadvantage that the male plug-in part fixing the female plug-in retainer is difficult to install requiring a considerable amount of force, to position it into its fixed position. The relatively complicated assembly or disassembly of the retainer on the known connectors often causes connection errors or failure-prone connections. A further disadvantage of the known connectors is that the wire retainer is completely separated from the connector, in particular when it is transferred to an open position, and thus represents a component that may be lost. In addition, at least in some known connectors not always a functionally reliable and tight connection between the male plug-in part and female plug-in part may be realized.

It would also be desirable to provide a connector that indicates that connection with the endform is sufficient.

It would be desirable to provide a connector that prevents contact between the tube or its endform with the wire retainer during insertion.

SUMMARY

A first embodiment of this disclosure provides a connector having a guided pilot for capturing a tubing endform. The connector comprises a receptacle including pilot in a mounting position, the pilot including an indicator piece slidable from the mounting position to a final position and first and second guide members located in first and second channels on the receptacle. Each of the first and second guide members slidable in their respective channels from the mounting position to the final position. A retention clip having legs is urged into a spread condition during a transition between the mounting position and the final position. In the final position, the pilot is past the legs of the retention clip whereby the legs of the retention clip retract to a relaxed condition and the indicator piece is visibly located on the receptacle and the first and second guide members latch the pilot to the receptacle.

In a second embodiment of this disclosure, an assembly of a connector and a tube is disclosed. The assembly comprising a receptacle including a pilot in a mounting position and slidable to a final position upon insertion of the tube into the receptacle, thereby urging legs of a retention clip into a spread condition while the pilot is sliding from the mounting position into the final position. First and second guide members attached to the pilot are located in first and second channels on the receptacle with each of the first and second guide members slidable in their respective channel from the mounting position to the final position. An indicator piece attached to the pilot is located in a third channel on the receptacle. The first and second guide members latch the pilot to the receptacle and the indicator piece becomes visibly positioned when the pilot slides past the legs of the retention clip permitting the legs of the retention clip to retract to a relaxed condition when the pilot is in the final position.

In a third embodiment, a process for coupling a tube is disclosed. The process comprising inserting a tube into a female end of a receptacle to a mounting position that engages a pilot mounted in the receptacle. The pilot including an indicator piece and first and second guide members located in respective channels on the receptacle with the indicator piece not visible in the mounting position. The process further includes inserting the tube into the female end of the receptacle to cause the legs of a retention clip into a spread condition while the pilot is transitioning from the mounting position to a final position. The pilot is guided by the indicator piece and the guide members during the transition. The process also includes inserting the tube into the receptacle to a final position permitting the legs of the retention clip to retract to a relaxed condition and causing the indicator piece to become visible indicating that the tube is coupled to the receptacle.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
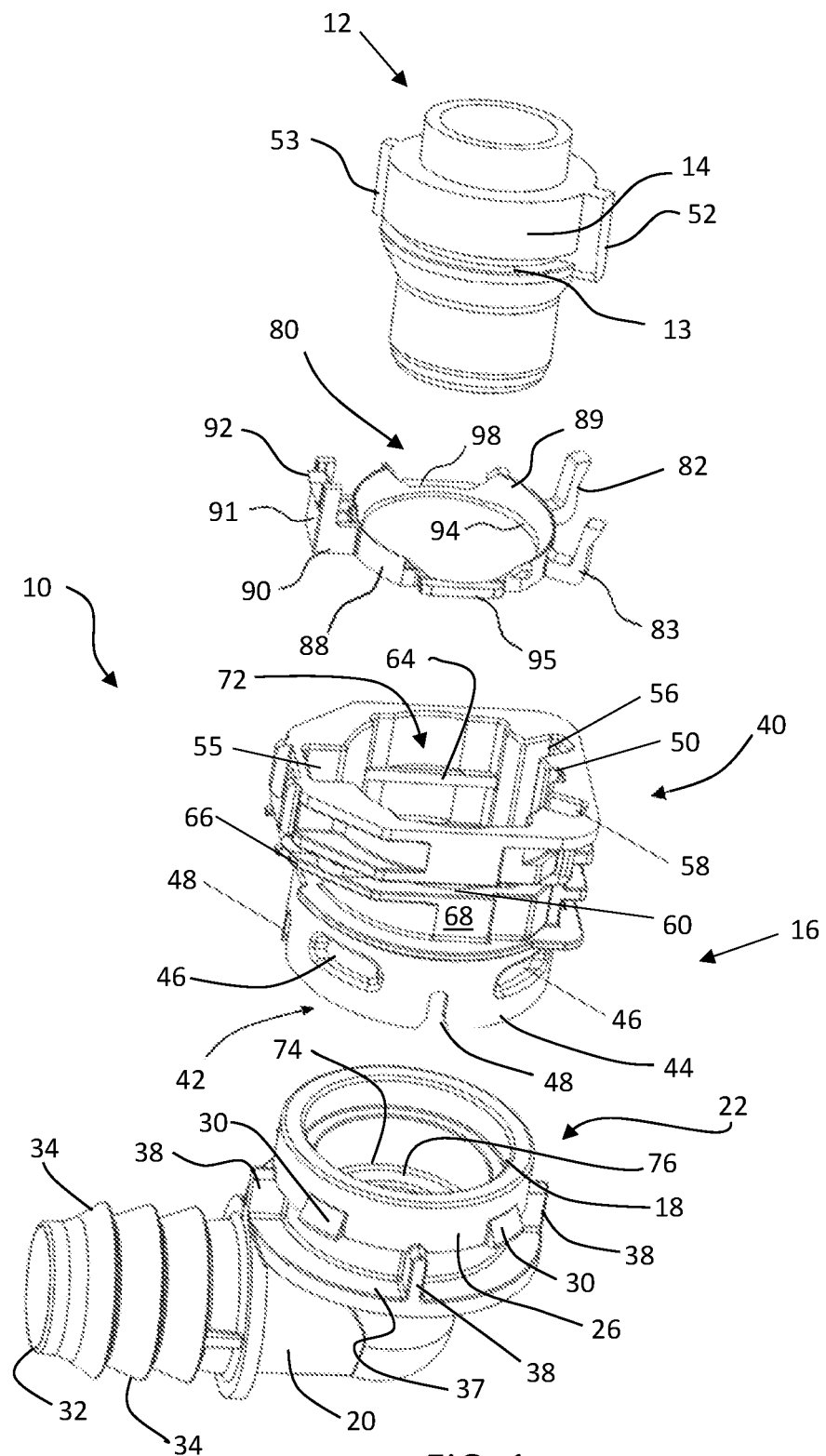
FIG. 1 illustrates an example exploded isometric view of a disassembled connector and tube.

An exploded view of an example connector 10 for coupling a tube 12 to another device is illustrated in FIG. 1. The other device may be another tube, or it could be a tank or a pump, for example. The tube 12 is partially shown in FIG. 1 and includes an endform 14 secured on an end of the tube 12. The tube 12 may be a hose, a pipe, or fluidly communicate with another device. The endform 14 may include a groove 13. The example connector 10 may be tubular defining a hollow passage through which a fluid may pass to or from the tube 12. In an aspect, the connector 10 may have an annular configuration made up of generally hollow cylindrical segments.

The connector 10 comprises a receptacle 16 for receiving the endform 14 of the tube 12. The receptacle 16 may comprise two separate pieces. The first piece of the receptacle 16 is a socket 22. The socket 22 has a female end 18 and a coupling end 20. The female end 18 of the socket 22 receives the end of the tube 12. Specifically, the socket 22 may receive the endform 14 of the tube 12 therein. The socket 22 includes an annular outer wall 26 surrounding the female end 18 defining an annulus.

A latch 30 may be fashioned on the outer wall 26. In an aspect, a plurality of latches 30 may be fashioned on the outer wall 26. The latches may be rectangular and include a chamfered surface that extends obliquely outward from outer wall 26. An annular brim 37 extends about the lower periphery of outer wall 26 below latches 30. The brim 37 further includes a projection 38 extending vertically from brim. In an aspect, a plurality of projections 38 may be fashioned on the brim 38.

The coupling end 20 may be for coupling the connector 10 to another device. The coupling end 20 may include a male stem 32 for mating with a receptacle of another device. The male stem 32 may include one or more barbed flanges 34 that can be friction fitted into another tube, for example, to couple the connector 10 to the other tube. In this embodiment, fluid from the tube 12 can pass from the tube through the female end 18 of the socket 22 and through the male stem 32 of the coupling end 20 of the connector 10 and into the other tube installed over stem 32 or vice-versa. The coupling end 20 may extend at any convenient angle applicable to the intended use of receptacle 16, which means that the coupling end 20 can have a feature, where the male stem 32, can have a longitudinal axis that may extend from the axis of the female end 18 obliquely, defining an angle between coupling end 20 and female end 18 that is not equal to 180 degrees.

The second piece of the receptacle 16 is a modular head 40. The modular head 40 has a mating end 42 with an annular outer wall 44 extending about the periphery of modular head 40 on its lower end. An opening 46 is located on the outer wall 44 extending through the outer wall. Additionally, the outer wall 44 includes a projection receiver 48 adapted to receive therein an associated projection 38 when the modular head 40 is installed on socket 22. In an aspect, a plurality of openings 46 and projection receivers 48 may be fashioned about the periphery of outer wall 44 of mating end 42.

The modular head 40 mates with the socket 22 to provide the receptacle 16. The mating end 42 of the modular head 40 is arranged to be inserted over the outer wall 26 of the socket 22. The mating of the modular head 40 to socket 22 is made by aligning a projection 38 with an associated projection receiver 48 and the modular head forced downward toward brim 37 to allow the chamfered portions of latches 30 to ride against the inside surface of the outer annular wall 44 until they are received within an associated opening 46, creating a snap-fit mechanical connection between the modular head 40 and socket 22. The mating end 42 of modular head 40 rests on brim 37 when the modular head 40 is fully inserted on socket 22 as can be best seen at FIG. 2. The socket 22 and the modular head 40 may be separately molded of a thermoplastic material such as polyamide or polyphthalamide.

The modular head 40 can be mated to the socket 22 in a plurality of relative orientations. The openings 46 and the plurality of latches 30 are located equidistant from each other around the periphery of modular head 40 outer wall 44 and socket outer wall 26. In other words, the latches 30 are at equivalent radial positions. Accordingly, the modular head 40 is adaptable to be mated to the receptacle 16 in a plurality of orientations. Additionally, the projections 38 are located on the brim 37 at relative orientations, further facilitating the mating of the modular head 40 in a plurality of orientations. In the embodiment of FIG. 1, the openings 46 and projection receivers 38 in the mating end 42 of modular head 40 are at four equidistant locations 90 degrees from each other. The latches 30 and projections 38 on socket 22 are also at four equidistant locations 90 degrees from each other. It will be well understood by those skilled in the art that due to the orientation of the latches 30 and openings 46 as well as the projections 38 and projections receivers 48, the connector 10 with a modular head 40 can be adaptable to be mounted in configurations that may have four different orientations between the connector 10 and the endform 14 of the tube 12. Advantageously, only one set of tooling must be fabricated to provide a connector 10 for four different orientations in an end product such as an automobile.

With renewed reference to FIG. 1, modular head 40 may include an indexing member 50 thereon for alignment with an indexing form 52 on the endform 14 of the tube 12 to ensure proper orientation therebetween. The indexing member 50 on the modular head 40 may be a groove and the indexing form 52 a tab extending from endform 14. The tab 52 is arranged to be received in the groove 50 to ensure proper alignment while inserting the endform 14 into the modular head 40. In an aspect, the tab could be the indexing member 50 on the modular head 40 and the groove could be the indexing member 52 on the endform 14 of the tube 12.

The endform may omit an indexing member 52, and it may also include an additional indexing member 53.

Figure 2:
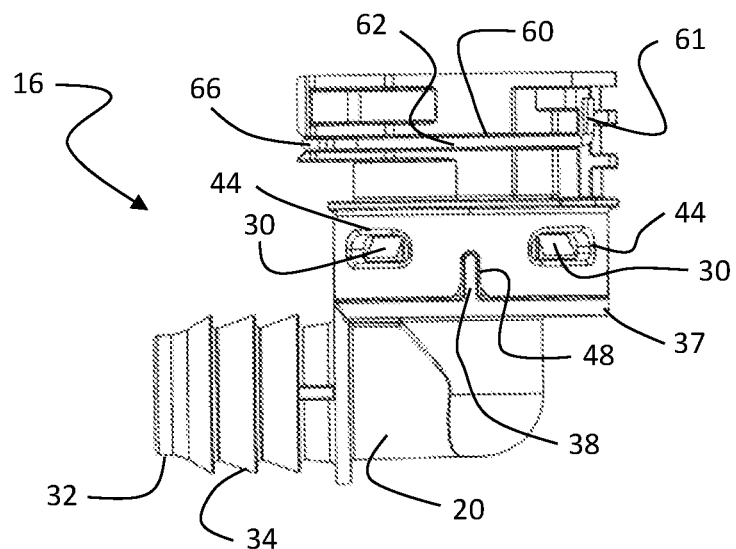
FIG. 2 illustrates a side elevational view of the assembled example connector.

As illustrated in FIG. 1, and FIG. 2, the connector 10 includes a wire retainer 60 embracing the modular head 40. The wire retainer 60 has a u-shaped configuration comprising two opposed legs 62, 64 extending from a bight 66. The wire retainer 60 is retained on the modular head 40 when mated to the socket 22, but it could be retained directly on the socket 22. The wire retainer 60 may be made of steel. The bight 66 embraces an outer wall 68 of the modular head 40, however legs 62, 64 extend through slots in wall 68, permitting the legs to extend into the interior 72 of the modular head 40 when the retention clip 60 is in a relaxed condition. Each leg 62, 64 terminates in an upturned prong 61 which is assembled onto the modular head 40 by passing through a slot contiguous and orthogonal to the slots in wall 68.

As explained above, the modular head 40 permits various orientations with respect to the socket 22. The modular head 40 can also be rotatable to provide a desired positioning of features of the receptacle 16 in an installed context. For example, the modular head 40 may be oriented with respect to the socket 22 to ensure access to the bight 66 among other equipment when installed.

Figure 3:
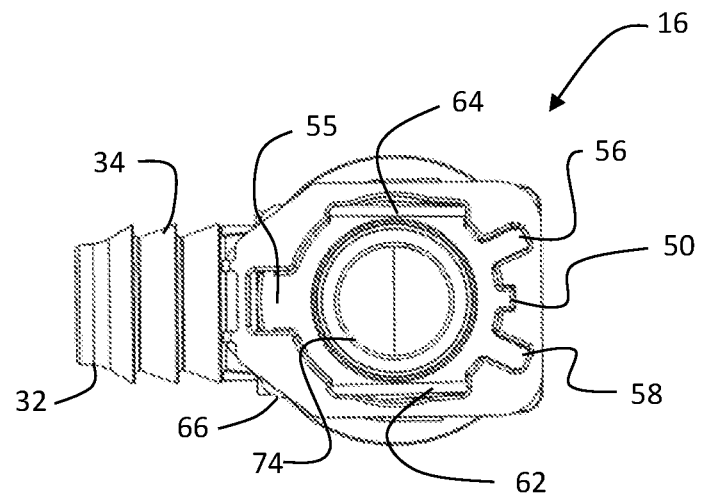
FIG. 3 illustrates a top plan view of the example connector of FIG. 2.

FIG. 1 and FIG. 3 illustrate an interior annular groove 74 in the socket 22. The annular groove 74 retains an elastomeric sealing assembly, for example an O-ring 76 in the groove 74. When the tube 12 is inserted into the socket 22, the O-ring 76 squeezes around the endform 14 of the tube 12 and prevents leakage of fluid passing therethrough.

Figure 4:
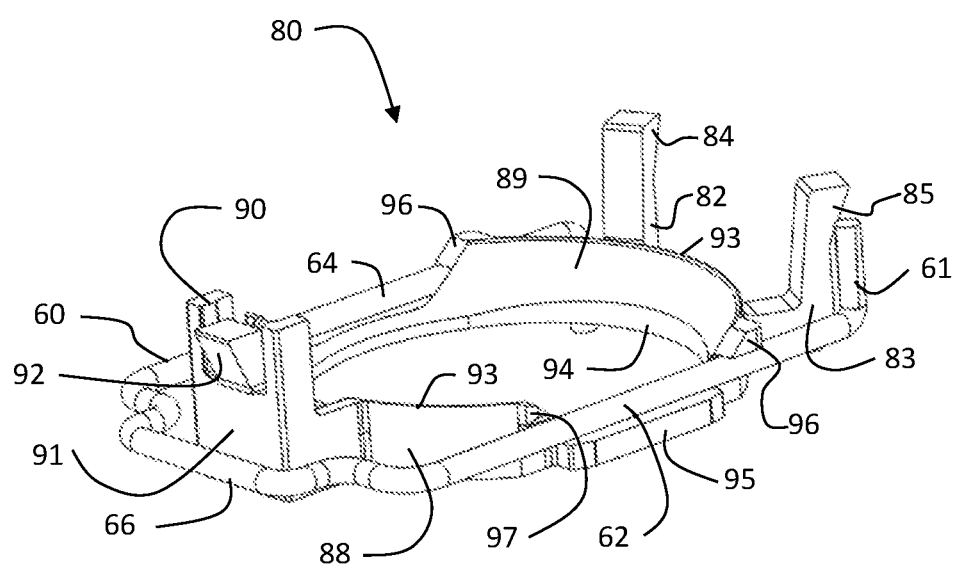
FIG. 4 illustrates an isometric view of the example pilot of FIG. 1, disassociated from the connector.

FIG. 1 and FIG. 4 illustrate a further feature of the example connector 10. A pilot 80 is shown that is comprised of an annular crown piece. The pilot 80 includes an indicator piece 90 which may comprise a flat face 91 and a wedge-shaped latching member 92. The latching member 92 includes a chamfered surface that extends outward from the flat face 91 at a top portion thereof. The pilot 80 has a front inclined wall 88 that has an inner diameter and an outer diameter at a mating end 93 that is a greater diameter than an inner diameter at an engaging end 94. A similar wall 89 is located on a rear end of the pilot 80. Consequently, the inside and an outside surface of walls 88 and 89 taper inwardly along a direction of insertion. Pilot 80 further includes first and second L-shaped guide members 82 and 83 extending outward from rear outer wall 89. The upper portions of legs 82 and 83 that include end portions 84 and 85 having chamfered surfaces that are oriented obliquely from the guide legs vertical orientation.

As is illustrated in FIG. 4, the pilot 80 further includes side members 95 and 98 that complete the side portions of pilot 80 between walls 88 and 89. Wall 88 terminates at a further member 97 on each side of the pilot 80. Similarly, wall 89 terminates at a member 96 on each side of pilot 80. Leg 62 of wire retainer 60 is located between members 96 and 97 and side member 96. Similarly leg 63 of wire retainer 60 is located between members 96 and 97 and side member 98. Members 96 and 97 also aid in the installation of the endform 14 over wire retainer legs 62 and 64 and which will be more fully explained later. The pilot 80 is mounted into the modular head 40 and becomes a part of the receptacle 16 upon mating of socket 22 and the modular head 40. The pilot is installed in the modular head 40 with indicator piece 90 accepted into a first channel 55 formed on one end of modular head 40. Similarly, each guide leg 82 and 83 is arranged to be accepted into an associated second and third channel 56 and 58 respectively, formed on another end of modular head 40 opposite from channel 55. Locations of the first 55, second 56 and third 58 channels can best be seen at FIG. 1 and FIG. 3.

Figure 5:
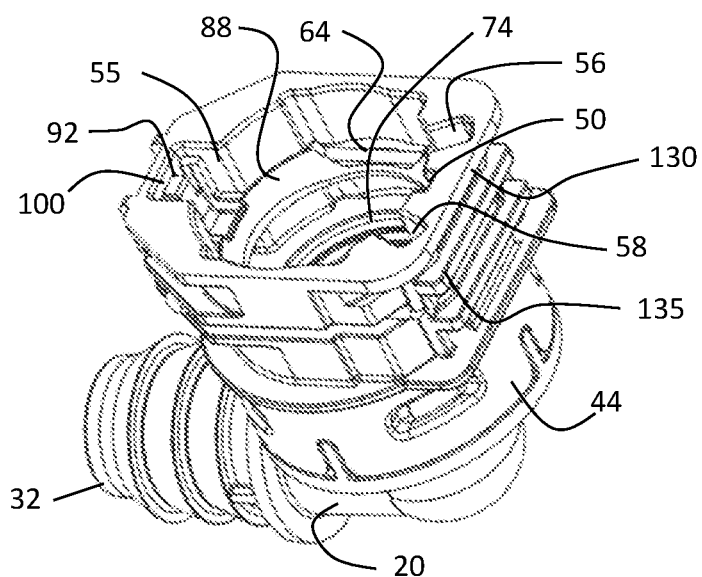
FIG. 5 illustrates an isometric view of the example connector, with the pilot in the mounting position.
Figure 6:
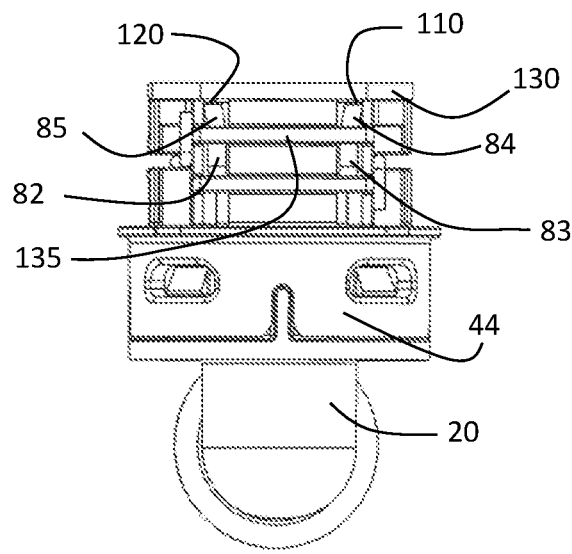
FIG. 6 illustrates a rear elevational view of the example connector of FIG. 5, with the pilot in the mounting position.

FIG. 5 illustrates in an isometric view the pilot 80 installed in modular head 40 in a mounting position. The mounting position being the position of the pilot 80 before insertion of the endform 14 into modular head 40 of receptacle 16. As can be seen, the indicator piece 90 is installed into channel 55 with latch 92 accepted and retained in a first opening 100. As can be best seen in FIG. 6, pilot legs 82 and 83 are installed in their associated second and third channels 56 and 58. Channels 56 and 58 include openings along the back wall of each channel 56 and 58 allowing end portions 84 and 85 to extend outward of the channel openings. The top surfaces 110 and 120 of legs 82, 83 rest against a bottom surface of a first rib member 130. Rib member 130 extends from a rear portion of modular head 40. A friction fit is exerted between the chamfered surfaces of end portions 84 and 85 against a second rib member 135 located below and oriented parallel with first rib member 130.

Figure 7:
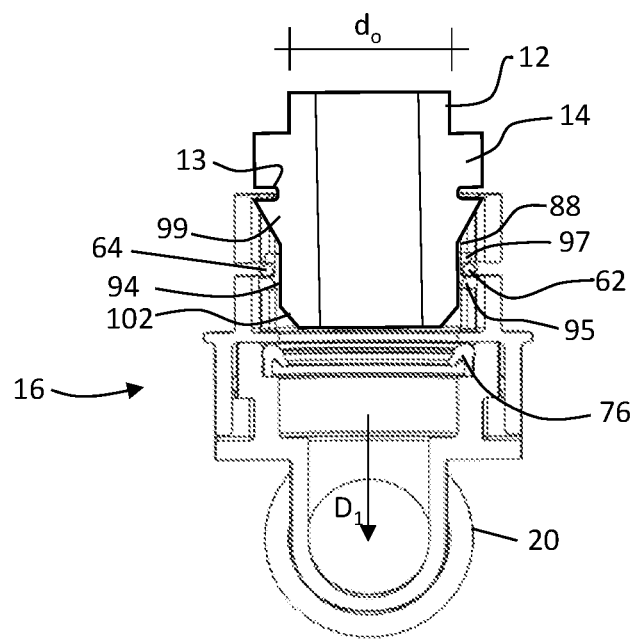
FIG. 7 illustrates a sectional view of the example connector, with the pilot in the mounting position.
Figure 8:
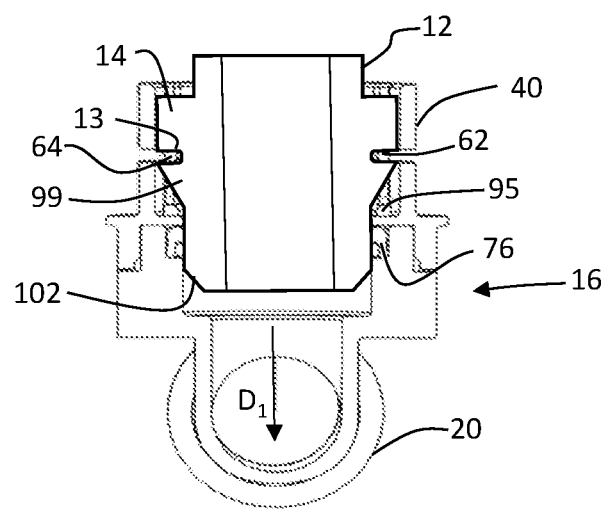
FIG. 8 illustrates a sectional view of the example connector, with the pilot in a final position.

The pilot 80 is slidable from the mounting position shown in FIG. 7 to a final position shown in FIG. 8. Insertion of the endform 14 of the tube 12 into the modular head 40 of the receptacle 16 results in the endform 14 engaging the pilot 80 to transition the pilot 80 from the mounting position to the final position.

As is shown in the sectional view of FIG. 7, the inner diameter of the pilot 80 at the engaging end 94 may be larger than the outer diameter do of the endform 14 to allow a terminal end 102 of the endform to pass through the inner diameter of the pilot 80 without moving the pilot upon insertion. The terminal end 102 of the endform 14 extends into the socket 22 and is arranged to be squeezed by the O-ring 76 when the endform reaches the final position. The endform 14 has an annular ramp 99 adjacent to the groove 13 that tapers inwardly in the direction of insertion $D_i$ to match the inner taper of the inclined walls 88 and 89. The inclined walls 88 and 89 have an inner taper that receives the annular ramp 99 of the endform 14 after the endform has moved sufficiently past the pilot 80 in the direction of insertion $D_i$. The ramp 99 engages an inner surface of the inclined walls 88 and 89 of the pilot 80 during insertion and slides the pilot 80 in the direction of insertion $D_i$ toward the final position. During transition from the mounting position to the final position in the direction of insertion $D_i$, the inclined wall 88 and 89 of the pilot 80, buttressed by the ramp 99 engages members 97 helping to move legs 62, 64 of retention clip 60 away from ramp 96, spreading legs 62 and 64 away from annular ramp 99. The spreading of legs 62, 64 of the retention clip 60 allows passage of the pilot 80 into the final position of FIG. 8.

As illustrated in FIG. 8, upon entry into the final position, ramp 99 of endform 14 moves pilot 80 downward, however, legs 62 and 64 of retention clip 60 remains in their original mounting position location. When the endform 14 reaches the final position legs 62 and 64 to retract to a relaxed condition and be retained within annular groove 13 of endform 14, retaining the endform 14 in the receptacle 16. In the final position, the terminal end 102 is squeezed by the O-ring 76 making a fluid tight seal.

Figure 9:
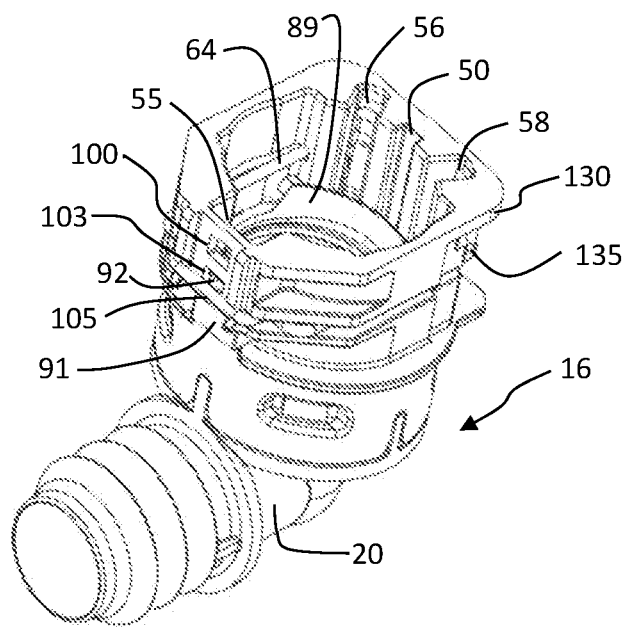
FIG. 9 illustrates an isometric view of the example connector, with the pilot in the final position.

FIG. 9 illustrates an isometric view of pilot 80 in the final position within receptacle 16 without the endform 14 installed to better illustrate the final position of the pilot 80 within receptacle 16. The indicator piece 90, in the mounting position, is located in channel 55 concealed in the channel behind aperture 103 above a rib member 105, as is illustrated in FIG. 5. During the transition from the mounting position to the final position, tab 53, of endform 14 engages indicator piece 90 to disengage latch 92 from aperture 100. The chamfered surface of latch 92 travels downward along channels 55 until it is accepted by and is captured in a second retaining aperture 103. In the final position, indicator piece 90 is moved to a position below rib member 105. When the indicator piece is located below rib member 105, particularly the face 91, exits channel 55 and becomes visible from outside of the connector 10. As the pilot 80 is forced downward by the endform 14, second and third legs 82 and 83 chamfered surfaces 84 and 85 are also disengaged from rib member 130 and are urged downward and inward by rib member 135 along the openings at the rear of channels 56 and 58.

Figure 10:
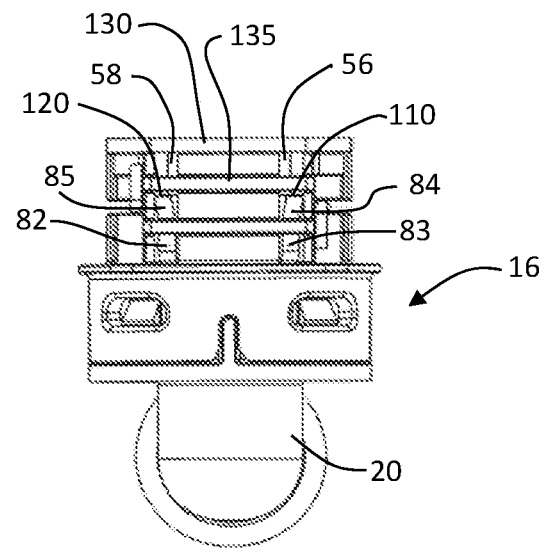
FIG. 10 illustrates a rear elevational view of the example connector of FIG. 9, with the pilot in the final position.

As is shown in FIG. 10, as the chamfered surfaces travel beyond rib member 135 they assume their relaxed position and spring outward from the channels 56 and 58 openings to engage surfaces 110 and 120 against a bottom surface of rib member 135. Endform tab 52 is further accepted and guided into the final position by channel 50.

Figure 11:
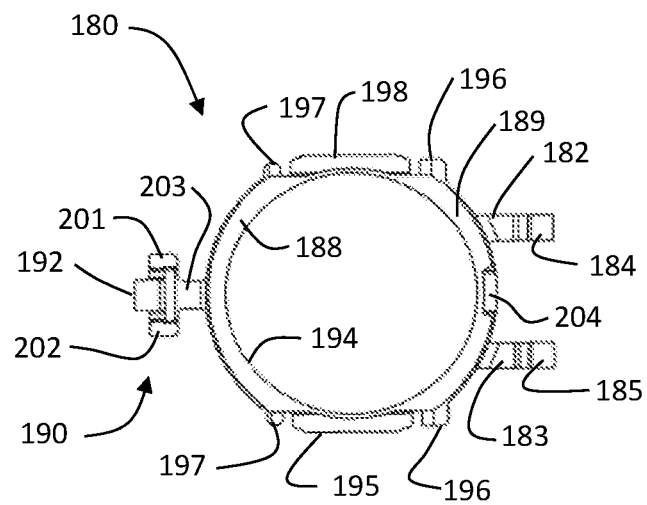
FIG. 11 illustrates a top view of another example pilot, disassociated from the connector.

FIG. 11 illustrates another example pilot 180. The pilot 180 is comprised of an annular crown piece and includes an indicator piece 190 which may be comprised of a flat face and a wedge-shaped latching member 192 extending from the flat face. The latching member 192 includes a chamfered surface that extends outward from the flat face at a top portion thereof. The indicator piece 190 further includes integrated guide members 201 and 202 located on either side of the latching member 192. A bracket 203 attaches indicator piece 190 to a front surface of inclined wall 188. Front inclined wall 188 has an inner diameter and an outer diameter that is a greater diameter than an inner diameter at an engaging end 194. A similar wall 189 is located on an opposite end of the pilot 180. Consequently, the inside and an outside surface of walls 188 and 189 taper inwardly toward engaging end 194 along a direction of insertion of the endform 14. Pilot 180 further includes first and second L-shaped guide members 182 and 183 extending outward from a rear surface of outer wall 189. The upper portions of legs 182 and 183 include end portions 184 and 185 that include chamfered surfaces that are oriented outward of the guide legs 182 and 183 vertical orientation. The pilot 180 further includes side members 195 and 198 that complete the side portions of pilot 180 between walls 188 and 189. Wall 189 further includes members 196 located on each side of pilot 180 adjacent members 195 and 198. Similarly, wall 188 includes members 197 on each side of the pilot 180 adjacent members 195 and 198. Members 196 and 197 aid in the installation of the endform 14 over wire retainer legs 62 and 64 as was explained earlier for example pilot 80. Wall 189 may further include a notch 204 formed on a rear portion of wall 189 between legs 182 and 183. The notch 204 is arranged to accept tab 52 of endform 14 when the endform is installed into receptacle 16 in the mounting position. Notch 204 also aids in applying the downward force $D_1$ imparted by tab 52 to the pilot 180 when transitioning from the mounting position to the final position as explained earlier at FIGS. 7 and 8.

Figure 12:
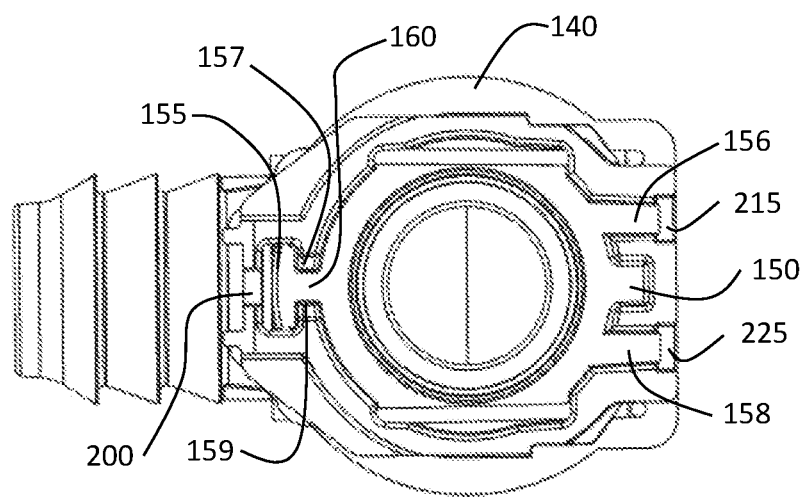
FIG. 12 illustrates a top view of another example connector, arranged to receive the example pilot of FIG. 11.

Turning now to FIG. 12, another example modular head 140 is illustrated configured to accept pilot 180. The pilot 180 is installed in the modular head 140 with indicator piece 190 installed into a first channel 155 with guide members 201 and 202 accepted in front of walls 157 and 159. Walls 157 and 159 are spaced apart from each other forming a cavity 160 therebetween. The pilot 180 indicator piece 190 is installed in first channel 155 with guide members 201 and 203 located to the front of walls 157 and 159 respectively, with bracket 203 installed in cavity 160. Similarly, each guide leg 182 and 183 is arranged to be accepted into an associated second and third channel 156 and 158 respectively, formed on another end of modular head 140 opposite from channel 155.

Figure 13:
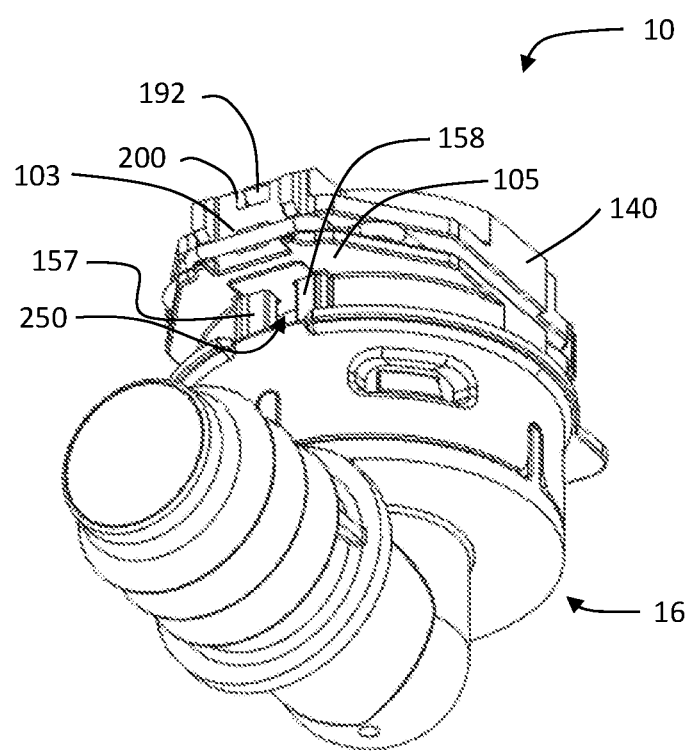
FIG. 13 illustrates an isometric view of another example connector, with the second example pilot in the mounting position.

FIG. 13 illustrates an isometric view, of the pilot 180 installed in modular head 140 in a mounting position. The mounting position being the position of the pilot 180 before insertion of the endform 14 into modular head 140 of receptacle 16. The installation of the pilot 180 into modular head 140 will now be explained. With renewed reference to FIG. 12, the indicator piece 190 is installed into channel 55 with latch 192 accepted and retained by a first recess 200. As can be seen in FIG. 13, in the mounting position the indicator piece 190 is located in the channel 155 in front of members 157 and 158 and bracket 203 is housed in cavity 160. In the mounting position indicator 190 and particularly the front face of the indicator is located within channel 155 above rib member 105. In the mounting position legs 182 and 183 of pilot 180 are installed in associated second and third channels 156 and 158. Channels 156 and 158 include openings along the back wall of each channel 156 and 158 allowing end portions 184 and 185 to extend outward of the channel openings when transitioning from the mounting position to the final position. The top portions of legs 182, 183 rest in recesses 215 and 225 formed on a top surface of modular head 140. A friction fit is exerted between the chamfered surfaces of end portions 184 and 185 against a second rib member 130, as illustrated and explained in FIG. 6 that retains the pilot 180 in the mounting position.

The pilot 180 is slidable from the mounting position in a similar manner as shown and explained in FIG. 7 and FIG. 8. Insertion of the endform 14 of the tube 12 into the modular head 140 of the receptacle 16 results in the endform 14 engaging the pilot 180, just as was done for pilot 80, to transition from the mounting position to the final position.

As illustrated in FIG. 13, the indicator piece 190, in the mounting position, is located in channel 155 and concealed by a front wall of the channel 155 above a rib member 105. During the transition from the mounting position to the final position, tab 53 of endform 14 engages bracket 203 of indicator piece 190 to move latch 92 from recess 200. The chamfered surface of latch 92 travels downward along channels 155 until it is accepted by and is captured in a retaining aperture 103. During transition guide members 201 and 202 of indicator piece 190 slide downward guided by channel walls 157 and 159 of channel 155 along with bracket 203 within the cavity 160. In the final position, indicator piece 190 exits channel 155 and is moved to a position below rib member 105. When the indicator piece is located below rib member 105, particularly the front face of the indicator piece, enters into area 250 to become visible from outside of the connector 10. The front face of indicator piece 190 may include a scan code. The scan code may be readable by a scanning device to indicate to a controller that the pilot is in the final position and the tube 12 and connector 10 are securely coupled. Simultaneously, as the pilot 180 is forced downward by the endform 14, second and third legs 182 and 183 chamfered surfaces 184 and 185 are also disengaged from recesses 215 and 225 and are urged downward along the openings at the rear of channels 156 and 158.

As the chamfered surfaces travel beyond recesses 215 and 225 they assume their relaxed position and spring outward from the channels 156 and 158 openings to engage their top surfaces against a bottom surface of rib member 135, in a similar manner as was explained above for pilot 80 in FIG. 10. As was explained earlier, tab 52 of endform 14 engages notch 204 and the tab 52 helps guide the pilot to the final position by traveling within channel 150.

While the following is described in conjunction with specific embodiments, it will be understood that this description is intended to illustrate and not limit the scope of the preceding description and the appended claims.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A connector comprising a receptacle including pilot in a mounting position, said pilot including:
   an indicator piece slidable from said mounting position to a final position;
   first and second guide members located in first and second channels on said receptacle each of said first and second guide members slidable in their respective channel from said mounting position to said final position;
   a retention clip having legs that are urged into a spread condition during a transition between said mounting position and said final position; and
   in said final position said pilot is past said legs of the retention clip, wherein said legs of said retention clip retract to a relaxed condition and said indicator piece is visibly located on said receptacle and said first and second guide members latch said pilot to said receptacle.

2. The connector of claim 1, wherein said retention clip embraces an outer wall of said receptacle and said legs of said retention clip extend through slots into an interior of said receptacle.

3. The connector of claim 1, wherein said pilot has openings on each side of said pilot and each opening receiving a leg of said retention clip to be accessible to the pilot in said mounting position.

4. The connector of claim 3, wherein said pilot has inclined walls adjacent to said openings said inclined walls including members arranged to urge said legs of said retention clip away from said walls while the pilot is sliding in transition to said final position.

5. The connector of claim 1, wherein said indicator piece is located in a third channel in the receptacle and is not visible while the pilot is in the mounting position.

6. The connector of claim 5, wherein each of said first and second guide members include a latching member each latching member arranged to be urged into an opening in said final position latching said pilot to the receptacle.

7. The connector of claim 6, wherein the indicator piece includes a latching member and said third channel includes an opening said indicator piece latching member engaging the opening when said pilot is in said final position.

8. The connector of claim 7, wherein said indicator piece includes a scan code which when readable indicates that the pilot is in the final position.

9. The connector of claim 7, wherein the indicator piece and the first and second guide legs are attached to the pilot and are arranged to guide the pilot in its transition from the mounting position to the final position.

10. An assembly of a connector and a tube, said assembly comprising:
    a receptacle including a pilot in a mounting position and slidable to a final position upon insertion of said tube into said receptacle, thereby urging legs of a retention clip into a spread condition while said pilot is sliding from said mounting position into said final position;
    first and second guide members attached to said pilot, said first and second guide members located in first and second channels on said receptacle and each of said first and second guide members slidable in their respective channel from said mounting position to said final position; and
    an indicator piece attached to said pilot, said indicator piece located in a third channel;
    wherein said first and second guide members latch said pilot to said receptacle and said indicator piece becomes visibly positioned on said receptacle when said pilot slides past the legs of the retention clip permitting the legs of said retention clip to retract to a relaxed condition when said pilot is in said final position.

11. The assembly of claim 9, wherein said retention clip embraces an exterior of said receptacle and legs of said retention clip extend through slots into an interior of said receptacle.

12. The assembly of claim 10, wherein said pilot has openings on each side of the pilot that receives legs of said retention clip while mounted in said mounting position.

13. The assembly of claim 11, wherein said pilot has an inclined wall adjacent to said openings said opening including members arranged to urge said legs of said retention clip while the pilot is in transition to said final position.

14. The assembly of claim 12, wherein tube includes an endform with a ramped wall that engages said inclined wall of said pilot during insertion of said tube while said pilot is in said mounting position.

15. The assembly of claim 12, wherein said the indicator piece is not visible in the window when said pilot is in said mounting position.

16. The assembly of claim 9, wherein each of said first and second guide members include a latching member, each latching member arranged to be urged into an opening in said final position latching the pilot to the receptacle.

17. The assembly of claim 10, wherein the indicator piece includes a latching member and said third channel includes an opening wherein said indicator latching member engages said opening when said pilot is in said final position.

18. The assembly of claim 14, wherein said indicator piece includes a scan code which when readable indicates that said pilot is in said final position and said tube is fully inserted into said receptacle.

19. The connector of claim 17, wherein the indicator piece and the first and second guide legs guide the pilot in its transition to said final position when said tube is fully inserted into said receptacle.

20. A process for coupling a tube comprising:
    inserting a tube into a female end of a receptacle to a mounting position that engages a pilot mounted in said receptacle, said pilot including an indicator piece and first and second guide member located in respective channels on said receptacle said indicator piece not visible in said mounting position;

further inserting said tube into said female end of said receptacle to cause the legs of a retention clip into a spread condition while said pilot is transitioning from said mounting position to a final position, said pilot guided by said indicator piece and said guide members during the transition; and fully inserting said tube into said receptacle to a final position permitting said legs of said retention clip to retract to a relaxed condition causing the indicator piece to become visible indicating that the tube is coupled to the receptacle.

\* \* \* \* \*